UNITED STATES PATENT OFFICE.

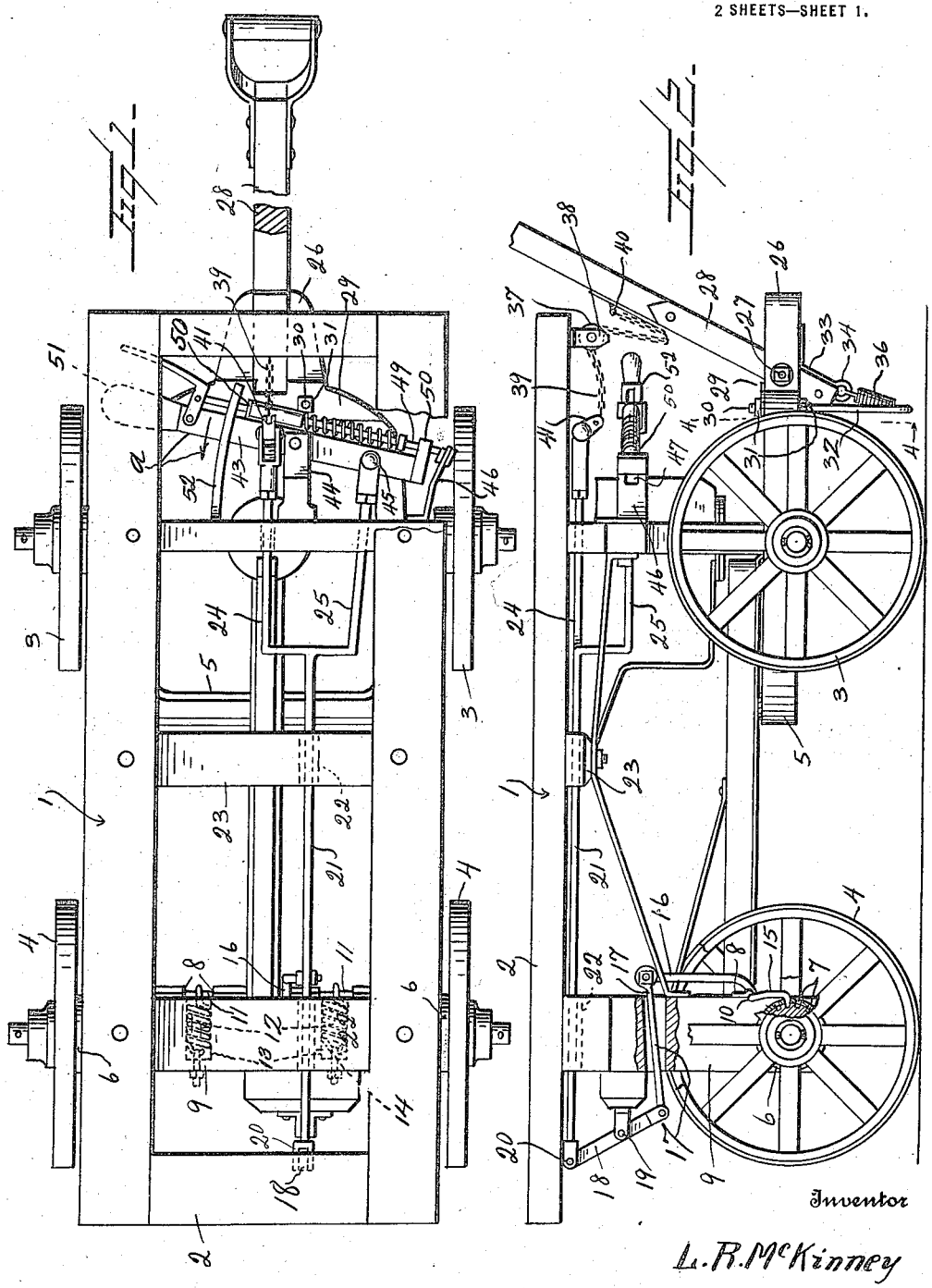

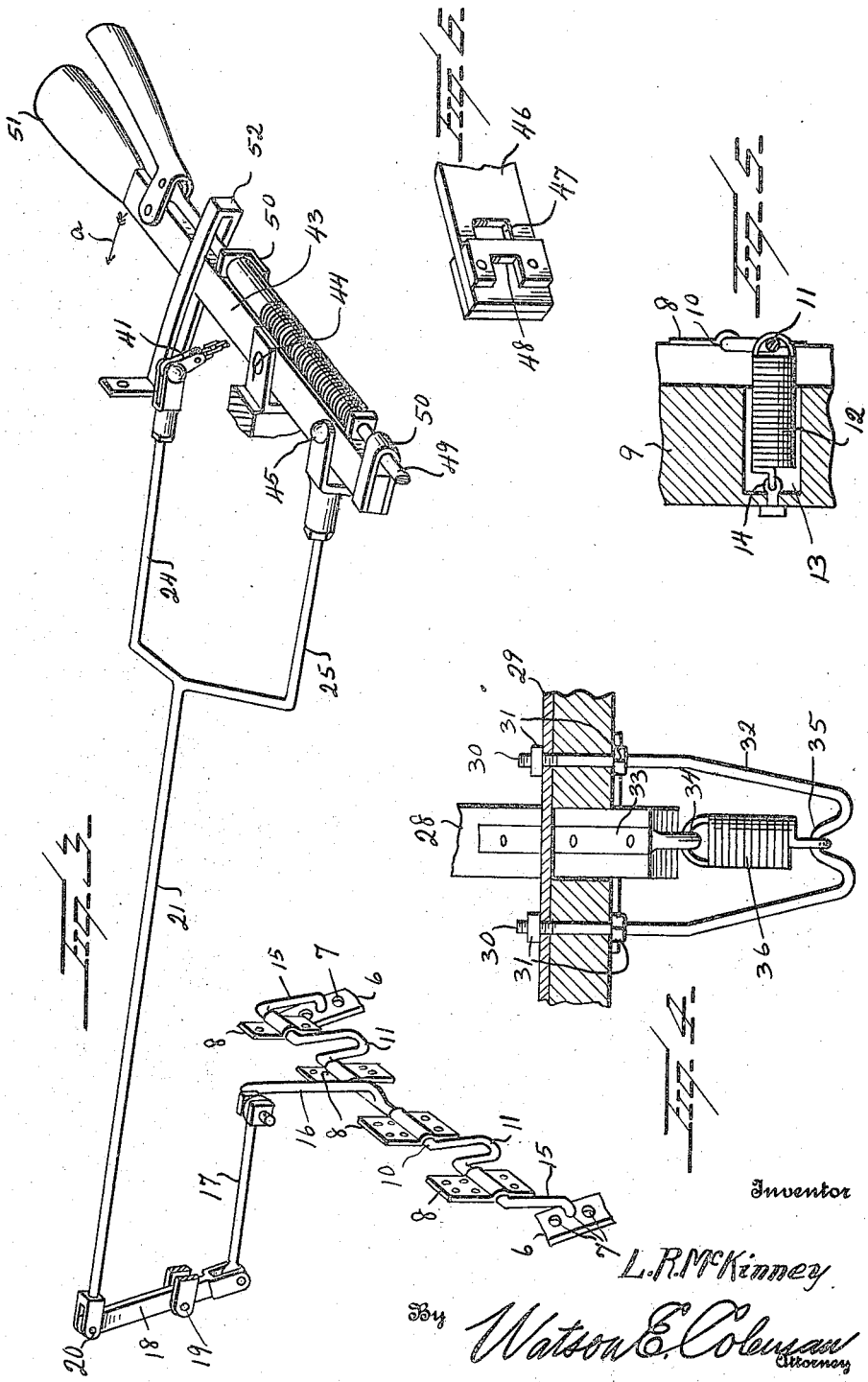

LEE R. McKINNEY, OF LINTON, INDIANA.

TONGUE-OPERATED LOCK FOR TRUCK WHEELS.

1,424,929.         Specification of Letters Patent.    Patented Aug. 8, 1922.

Application filed November 13, 1920. Serial No. 423,881.

*To all whom it may concern:*

Be it known that I, LEE R. MCKINNEY, a citizen of the United States, residing at Linton, in the county of Greene and State of Indiana, have invented certain new and useful Improvements in Tongue-Operated Locks for Truck Wheels, of which the following is a specification, reference being had to the accompanying drawings.

For a long time past the railroads and express companies have desired a truck for handling baggage and shipped goods, and one so mechanically constructed, as to not only lock the rear wheels of the truck and control it by the hand tongue of the truck, but also a truck, wherein means is afforded for holding the tongue in an upright position when the truck is not in use.

With this necessity in view the present invention has for its purpose to provide a truck of this character, namely, one wherein operative connections are afforded between the hand operated tongue and the hubs of the rear wheels, whereby upon the manipulation of the tongue from a perpendicular or upright position to a horizontal position, the rear wheels may be unlocked, and upon a return movement or reciprocation of the tongue to its initial position will automatically lock the rear wheels.

In using trucks heretofore produced, the railroads and express companies have found more or less difficulty in maintaining the truck in position and against accidental movement, while adjacent the car to be unloaded, or adjacent the platform at a station or otherwise, when placing the baggage or other shipped goods upon the truck. Very often the trucks of the old design move or become displaced, very often not only causing the misplacement of the baggage or other shipped goods, but very often causing the baggage or other commodities being disturbed or pushed off the truck, hence necessitating reloading the truck. Accidents have occurred due to the falling of the baggage from the truck owing to it becoming misplaced or being moved accidentally, hence it is the aim of the present invention to avoid and overcome these difficulties and disadvantages.

Still another purpose is the provision of a truck, wherein means is afforded for manipulating the lock on the rear wheels independently of the movement of the tongue.

As an additional purpose it is the aim to provide means for holding the lock of the rear wheels unlocked, while the tongue is in a lowered operative position, for pushing and steering the truck.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a plan view of the truck showing the improved tongue operated lock mechanism as applied thereto and constructed in accordance with the invention.

Figure 2 is a view in side elevation of the truck, showing the tongue operated lock mechanism as applied, and showing part of the rear bolster in section, and a part of the hub of the rear wheel in section to show the band 7.

Figure 3 is an enlarged detail perspective view of the tongue operated lock mechanism as detached from the truck.

Figure 4 is a sectional view on line 4—4 of Figure 2.

Figure 5 is a detail view in section of the rear bolster, showing one of the springs 12 and the depression or cavity 13.

Figure 6 is a detail perspective view of the parts 46, 47 and 48.

Referring more especially to the drawings, 1 designates the truck as a whole, 2 the truck body or frame, and 3 and 4 denote the forward and rear wheels.

The forward wheels are carried upon the usual axle, which is supported upon the usual front bolster, and carried, by the front bolster are the forward hounds 5.

The rear wheels 4 have metallic bands 6 secured to the hubs. These bands 6 are provided with a plurality of apertures or perforations 7 adjacent the inner edges thereof, and mounted in bearings 8 of the rear bolster 9 of the truck is a rock shaft 10. The rock shaft is provided with crank arms 11, to which springs 12 are attached. These springs 12 engage in depressions 13 of the rear bolster of the truck, and have their rear ends anchored or attached at 14 to the bottoms of these depressions, thereby so actuating and tensioning the crank shaft, as to hold the hooked arms 15 of the shaft in engagement with any two opposite perforations or apertures of the bands 6, so as to hold the rear wheels locked. The crank rock shaft 10 is provided with an elongated arm 16, and pivotally connected thereto is a link 17, which passes through an opening of the rear bolster and is pivoted to the short arm of a rocking link 18, which is pivoted at 19 on the rear bolster of the truck.

The long arm of the rocking link 18 has pivoted thereto as at 20 a reciprocating push rod 21, which operates through openings 22 of the upper portion of the rear bolster and the cross piece 23 of the truck.

The forward portion of this push rod 21 terminates in two arms 24 and 25, which are relatively widely separated, and are operable through openings in the forward bolster of the truck.

The forward hounds have forwardly extending spaced arms 26, and between which and upon a bolt 27 the hand operative tongue 28 is pivotally mounted. The hounds are connected by means of a plate 29, acting as an abutment, with which the lower short end of the tongue contacts, to limit the tongue in a horizontal position.

The members 30 which cooperate with the nuts 31 for holding the abutment plate 29 in place, constitute arms of a yoke 32, which depends from the forward hounds.

A metal strap 33 having an eye 34 is carried by the short end of the tongue, and connecting the eye and a notch 35 of the arch of the yoke 32 is a relatively heavy coiled tension spring 36, acting to hold the tongue substantially in an upright or perpendicular position. To use the tongue, manual pressure is applied thereon, whereby the spring 36 is brought under tension, therefore it is obvious that as soon as the pressure is relieved on the tongue, the spring 36 will automatically return the tongue to a substantially perpendicular or upright position.

A guide pulley 37 is carried by a bracket 38 on the under part of the forward portion of the truck frame, and engaging the pulley 37 is a chain 39. This chain is connected at one end to the tongue as shown at 40, and has its other end connected to a link 41 of the arm 24 of the push rod 21. It will be noted that this chain is to be more or less relatively loose, so that when the tongue is in a lowered or horizontal position, the tongue is free to be moved in either direction laterally, for the purpose of steering the front wheels of the truck. It will be noted that upon movement of the tongue from a perpendicular or upright position to a horizontal position, a pulling action will be imparted upon the chain, which in turn will pull upon the arm 24 of the push rod, and impart a reciprocating movement to the rod. The rod 21 will in turn actuate the rocking link 18, and through this link connection with the arm of the rock crank shaft, said rock crank shaft will be rocked in its bearings, causing the hooked arms thereof to withdraw from the apertures or perforations of the bands 6 on the rear wheels, thereby permitting the truck to move from one place to another.

A lever 43 is pivotally mounted on a bracket 44 which is carried by the front portion of the forward bolster of the truck. The bracket extends forwardly of the bolster, sufficiently to space the lever 43 from the bolster. The other arm 25 of the push rod is pivotally connected at 45 to the lever 43, so that it is obvious that when the lever 43 is tilted upon its pivot in the direction of the arrow $a$, a pulling movement will be imparted upon the push rod 21, thereby actuating the rocking link 18 and disengage the hooked arms of the rock crank shaft from the perforations or apertures of the bands on the hubs of the front wheels. It will be noted that the rear wheels may be unlocked by means of the lever, without manipulating the tongue, and said wheels may be unlocked by the tongue, without manipulating the lever 43.

Carried by the forward bolster is a plate 46 provided with an opening 47 and a notched plate 48. The lever 43 carries a spring tensioned rod 49 mounted in bearings 50 of the lever, and is designed to ordinarily engage the notched plate. However when the truck is stored away and will not be used more or less for one or more hours, the lever 43 may be moved, and the spring tensioned rod 49 actuated so as to escape engaging the notched plate. In other words the end of the rod will pass over the notched plate, and engage the opening 47, thereby holding the wheels locked, whereby neither the tongue or the lever may unlock the wheels.

However the lever may be moved to unlock the wheels, by first manipulating the hand grip 51 which is pivotally carried by the lever 43 and is in turn connected to the spring tensioned rod. The lever 43 operates in a guide 52 on the forward bolster.

The invention having been set forth, what is claimed as being useful is:—

1. In a device as specified, a truck having forward and rear wheels, a lock mechanism for the hubs of the rear wheels, a tongue pivotally mounted on the forward hounds of the forward wheels, and operatively connected with the lock mechanism, whereby upon moving the tongue from a substantial perpendicular position to a horizontal position and back again the lock mechanism actuates to unlock and lock the rear wheels, and means operatively connected with the lock mechanism for actuating the mechanism independently of the tongue.

2. In a device as specified, a truck having forward and rear wheels, a lock mechanism for the hubs of the rear wheels, a tongue operatively mounted on the forward hounds of the forward wheels and operatively connected with the lock mechanism, whereby upon moving the tongue from a substantial perpendicular position to a horizontal position and back again the lock mechanism acts to lock and unlock the rear wheels, and means operatively connected with the lock mechanism for actuating said mechanism independently for locking the rear wheels, said tongue being movable from its perpendicular position to unlock said locking mechanism and restore said means to its initial position.

In testimony whereof I hereunto affix my signature.

LEE R. McKINNEY.